Oct. 19, 1965     C. C. ANDERSON     3,212,118
ROAD SWEEPER
Filed Oct. 19, 1962     2 Sheets-Sheet 1
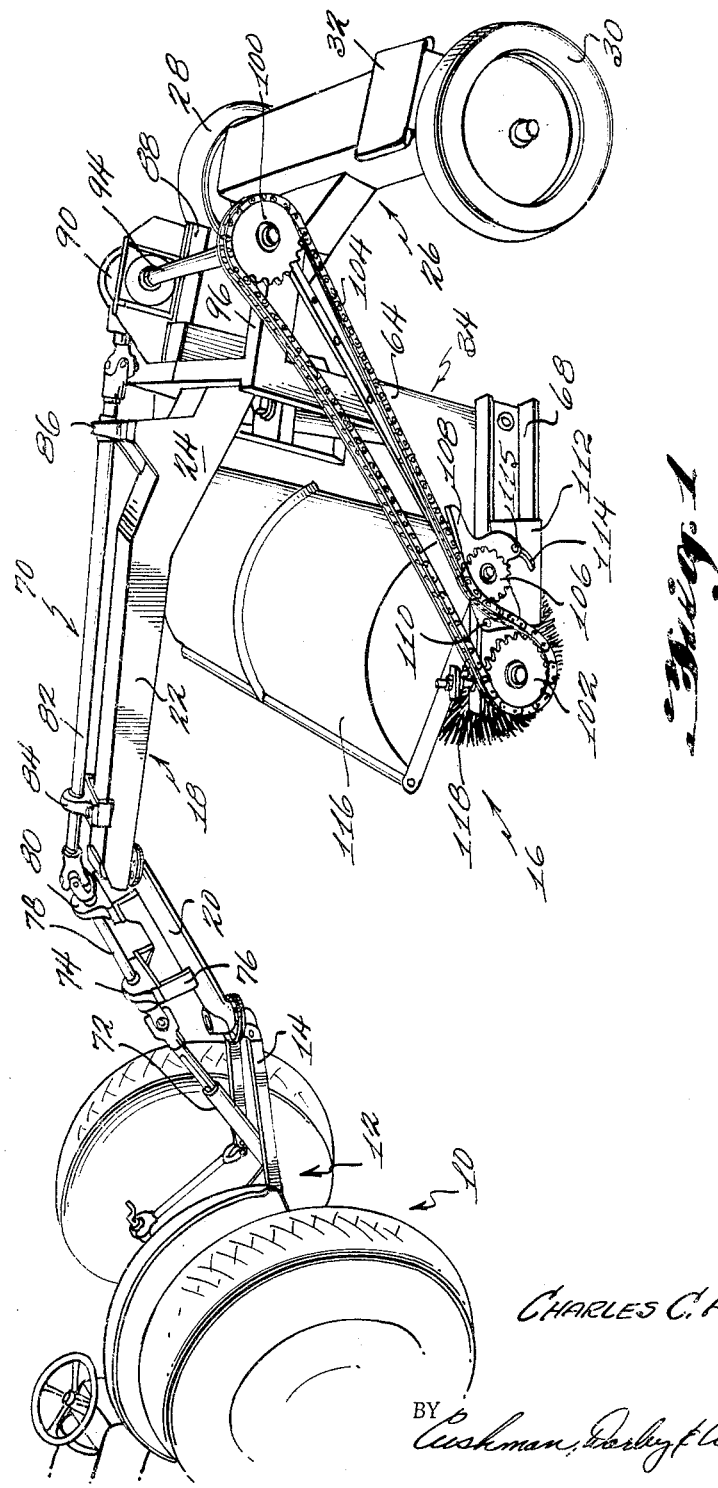
INVENTOR
CHARLES C. ANDERSON
BY Cushman, Darby & Cushman
ATTORNEYS Oct. 19, 1965　　　C. C. ANDERSON　　　3,212,118
ROAD SWEEPER
Filed Oct. 19, 1962　　　　　　　　　　　　　2 Sheets-Sheet 2
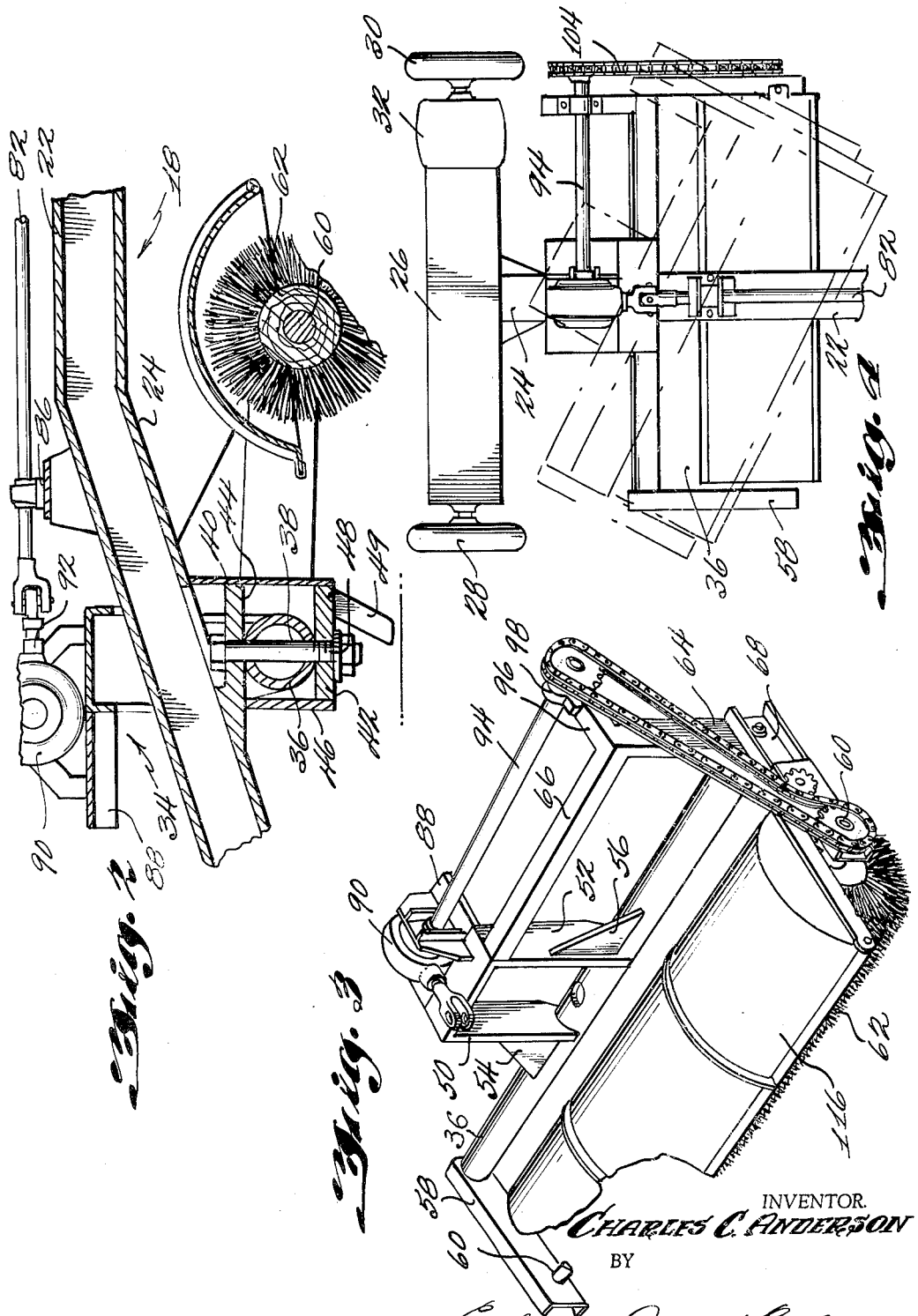
INVENTOR.
CHARLES C. ANDERSON
BY
Cushman, Darby & Cushman
ATTORNEYS

United States Patent Office 3,212,118
Patented Oct. 19, 1965

3,212,118
ROAD SWEEPER
Charles C. Anderson, P.O. Box 91, McAlester, Okla.
Filed Oct. 19, 1962, Ser. No. 231,629
1 Claim. (Cl. 15—82)

This invention has reference to road sweepers constructed and arranged to be towed by a vehicle, the sweeper being driven from a power takeoff at the rear of the vehicle.

It is a well-known practice to mount road sweepers at the front end of a vehicle, such as a tractor, wherein the vehicle is operative to push the road sweeper along the road for cleaning purposes. Such arrangements in the prior art practice of pushing a road sweeper are undesirable from the standpoint that the driver of the vehicle is hampered in handling the same due to the cumbersome structure carried forwardly of the vehicle. Further, conventional tractors and the like commonly employ power takeoff drive means at the rear end thereof, and the drive train to the front of a pushed road sweeper is relatively complex and unhandy. An added shortcoming of such road sweepers lies in the necessity for providing rather elaborate steering mechanisms for the road sweeper.

It is accordingly an object of the present invention to provide a road sweeper of new and improved construction operative to be towed by a vehicle such as a tractor, there being provided drive means for the sweeper from the power takeoff connection at the rear of the vehicle.

This invention also contemplates the provision of a road sweeper operative to be towed, there being provided a simple and reliable connection to the vehicle so that the sweeper may be quickly and easily assembled at its towed position behind the vehicle.

There is also provided by this invention a tractor-mounted road sweeper which is towed in a new and improved manner, there being provided a power drive train mounted on the sweeper frame for driving the sweeper, the road sweeper being of inexpensive construction and reliable and trouble-free in use.

These and still further objects, advantages, and improved features of the present invention will become evident in the specification and claim, taken in connection with the accompanying drawings.

In the drawings:

FIGURE 1 is a perspective view of the road sweeper attached to the rear of a tractor so as to be towed thereby;

FIGURE 2 is a longitudinal section view of a portion of the road sweeper;

FIGURE 3 is a perspective view of one frame; and

FIGURE 4 is a plan view of the rear portion of the road sweeper.

Referring now to the drawings there is shown a tractor 10 having a rear-end power takeoff connection 12. The tractor 10 has a conventional towing bracket 14 extending rearwardly therefrom with a hitch connection at its rearwardmost end. A road sweeper 16 is operative to be connected to the towing bracket 14 and receives a drive from the power takeoff 12 of the tractor 10.

The road sweeper 16 takes the form of a main frame 18 extending longitudinally with a downwardly extending front end 20 joined at its bottom end to the hitch in the usual fashion. This longitudinally extending main frame 18 has a generally horizontal part 22 which extends downwardly at 24 and is joined at its rearward end to a transverse wheel assembly frame 26 wherein opposed wheels 28 and 30 ride along the ground and a seat 32 is conveniently provided adjacent one of the wheels. This longitudinally extending main frame 18 thus defines the central part of the road sweeper 16, support at the front end being provided by engagement tractor towing bracket 14 and support at the rearward end being provided by the wheels 28 and 30.

Mounted for movement in a horizontal direction about a vertical axis is a second frame 34. This second frame 34 is connected to the main frame 18 by a pivot connection as will now be explained. The second frame 34 includes a transversely extending pipe or the like 36 having a central vertical aperture 38 therethrough. The main frame 18, in turn, carries a box-like structure adjacent the underside of the part 24. In this regard, there is provided a depending front plate 40 joined as by welding to the underside of the part 24 of the main frame 18, a fixed top plate 44 and a rear plate 46 welded to the top plate 44. A clamping plate 42 is disposed between and free of the lower ends of the plates 40 and 46. The pipe 36 is clamped between the plates 42 and 44 and is mounted for pivotal movement by a vertical bolt 48 which passes through both the plates 40 and 42 and the central apertures 38 in the pipe 36. The distance between the front plate 40 and the back plate 46 is substantially greater than the diameter of the pipe 36 so that a considerable amount of rotary movement may be provided by the bolt 48. As will become evident, this arrangement allows adjustment of the road sweeper as desired.

A support plate 49 conveniently depends from the plate 42 so as to carry the weight of the sweeper 16 when not hitched to the tractor 10. The second frame 34 also has two upright plates 50 and 52 which are joined as by welding to the pipe 36 so that the main frame 18 passes between these plates 50 and 52. These plates are spaced apart from the main frame 18 sufficient to prevent interference with rotary movement about the bolt 48. These upright plates 50 and 52 are reinforced by web plates 54 and 56 which latter plates are joined to the pipe 36 and to the adjacent upright plates. One end of the pipe 36 carries a forwardly extending bracket plate 58, to which is joined one end of the shaft 60 of a cylindrical road sweeper brush 62. The other end of the pipe 36 is joined to a vertical structural member 64, this member also being joined to the upright plate 52 adjacent thereto by a laterally extending supporting bracket 66. The lower end of the vertical structural member 64 carries a forwardly extending bracket plate 68 (aligned with the bracket 58) and which receives the other end of the road sweeper shaft 60.

In order to drive the road sweeper brush 62, power is taken from the power takeoff 12 of the tractor 10. To this end there is provided a drive train 70. The forward end of this drive train takes the form of a telescoping rod connection 72 of splined construction which is joined at its lower forward end to the power takeoff connection 12. The downwardly extending front part of the drive train 70 carries a bearing block 74 on a suitable bracket plate 76. This bearing block 74 carries another shaft 78 which is joined at its forward end to the rearward end of the telescoping rod 72. The rearward end of this shaft 78 is mounted on a bearing block 80 of similar construction so that its yoke-shaped rearward end engages the complementary forward end of a long shaft 82 mounted on top of the horizontal plate 22 of the main frame by front and rear bearing blocks 84 and 86, respectively. The rearward end of the long shaft 82 extends in the region of the second frame 34.

The second frame 34 carries a platform 88 at its upper end and rearwardly of the upright plates 50 and 52. This platform 88 carries a differential gear box 90 having an aligned input shaft 92 joined at its free end to the rearward end of the shaft 82. A flexible connection is here provided as is known in the art so that relative rotation by the main frame 18 and the second frame 34 will not impede the transmission of power along the drive train 70. The output side of this differential gear box 90 is connected to a transversely extending drive shaft 94, the opposite end of which extends to the side of the road sweeper 16 carrying the vertical structural member 64. The drive shaft 94 is supported in this region by a rearwardly extending bracket plate 96, which carries a bearing block 98. The free end of the drive shaft 94 adjacent the side of the sweeper 16 carries a sprocket wheel 100 in driving relationship as by a keyway connection (not shown). The road sweeper shaft 60 carries another sprocket wheel 102 outside of the bracket plate 68, in driving relationship, and an endless sprocket chain 104 is trained about the sprocket wheels 100 and 102. In order to regulate the sprocket chain 104, an idler sprocket wheel 106 is mounted on an adjusting plate 108 which is pivotally connected to the bracket 68 at 110, the bracket plate 68 carrying a stationary plate 112 with an arcuate slot 114. A bolt 115 is passed through the arcuate slot 114 and the adjusting plate 108 to allow manual adjustment of the idler sprocket wheel 106, as necessary. An arcuate hood 116 is mounted above the brush 62, angular adjustment being provided by an adjusting screw 118 which engages the top side of the bracket plate 68.

Thus, the drive train 72 transmits power from the power takeoff 12 to the tractor to the sweeper drive shaft 60 via the shafts 72, 78, 82, the differential gear box 90, the shaft 94 and the sprocket wheel 100, thence to the sprocket wheel 102 of the drive shaft 60 via a sprocket chain 104.

In order to change the horizontal position of the cylindrical sweeper brush 62 with respect to the longitudinally extending main frame 18, the bolt 48 is loosened and the position of the pipe 36 is angularly pivoted in a horizontal plane as desired and the bolt is then tightened up. In such instances, the drive train 70 transmits power to the sweeper brush shaft 60 due to the fact the drive connection between the main frame 18 and the second frame 24 at the differential gear box 90 is such that power will be smoothly delivered through these angular relationships. The differential gear box 90 is of conventional construction and is designed to accommodate the angular relative movement between the gear box 90 and the long shaft 82.

Conveniently, the speed of rotation of the sweeper brush 62 is regulated by the driver of the tractor 10 due to the power transmission to the sweeper brush 62 being from the power takeoff connection 12. The road sweeper 16, being towed, is thereby easily handled and the cumbersome connection necessary for front-end mounting of the road sweeper brush and the elaborate structure required to assemble the same to the front of the tractor or the like is effectively eliminated.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

A road sweeper for attachment to a tractor having a power take-off connection at its rear end comprising: an elongated main frame having a front end and a rear end; a pair of laterally spaced wheels carried by said main frame at the rear end thereof; means for pivotally connecting the front end of said main frame to the rear of the tractor; a second frame including a member generally transverse to and disposed above said main frame and a pair of horizontally spaced members depending from said transverse member on opposite sides of said main frame; a generally transverse brush-supporting member disposed below said main frame and fixedly secured to said depending members, the portion of said transverse member between said depending members having a vertical hole therethrough; a cylindrical brush disposed below said main frame and rotatable about its longitudinal axis for sweeping a road or the like; means mounting said brush on said brush-supporting member forwardly of said second frame; a vertical pin disposed in said hole and connected to and supported from said main frame; and means for releasably securing said transverse member to said pin in a variety of rotatable positions relative to said main frame, whereby said second frame and said brush may be rotated in a horizontal plane relative to said main frame.

References Cited by the Examiner

UNITED STATES PATENTS

| 2,055,011 | 9/36 | Hough | 15—82 |
| 2,229,230 | 1/41 | Wagner | 15—82 |
| 2,259,632 | 10/41 | Grace | 15—82 |
| 2,259,724 | 10/41 | Barthlow | 15—82 |
| 2,830,517 | 4/58 | Keyes | 172—79 |
| 2,978,720 | 4/61 | Lull | 15—82 |
| 3,030,760 | 4/62 | Weaver | 56—377 |

FOREIGN PATENTS

| 154,738 | 1/54 | Australia. |
| 699,442 | 11/53 | Great Britain. |

CHARLES A. WILLMUTH, *Primary Examiner.*